(12) United States Patent
Takayanagi

(10) Patent No.: US 6,191,870 B1
(45) Date of Patent: Feb. 20, 2001

(54) IMAGE COMMUNICATION METHOD AND APPARATUS THEREFOR

(75) Inventor: Masahiro Takayanagi, Yokohama (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 08/418,159

(22) Filed: Apr. 6, 1995

Related U.S. Application Data

(63) Continuation of application No. 07/984,839, filed on Dec. 3, 1992.

(30) Foreign Application Priority Data

Dec. 4, 1991 (JP) ..................................... 3-320331

(51) Int. Cl.$^7$ ..................................... H04N 1/387
(52) U.S. Cl. ........................................... 358/450; 358/452
(58) Field of Search ..................................... 358/450, 452, 358/453, 444, 448, 449, 451, 442; 382/44, 47; 395/102, 104, 109, 116, 117

(56) References Cited

U.S. PATENT DOCUMENTS

| 4,342,052 | | 7/1982 | Rackley et al. . | |
| 4,366,475 | | 12/1982 | Kishi et al. . | |
| 4,608,662 | * | 8/1986 | Watanabe et al. | 364/900 |
| 4,672,459 | * | 6/1987 | Kudo | 358/452 |
| 4,672,462 | * | 6/1987 | Yamada | 358/450 |
| 4,920,337 | * | 4/1990 | Kuo | 340/721 |
| 5,051,843 | * | 9/1991 | Hayashi | 358/450 |
| 5,086,434 | * | 2/1992 | Abe et al. | 358/450 |
| 5,119,081 | * | 6/1992 | Ikehira | 340/723 |
| 5,124,798 | * | 6/1992 | Tanabe et al. | 358/296 |
| 5,191,429 | * | 3/1993 | Rourke | 358/450 |
| 5,191,440 | * | 3/1993 | Levine | 358/450 |
| 5,202,828 | * | 4/1993 | Vertelney et al. | 364/419 |
| 5,204,946 | * | 4/1993 | Shimamura | 395/146 |
| 5,231,516 | * | 7/1993 | Kamon et al. | 358/450 |
| 5,247,372 | * | 9/1993 | Tsutamori et al. | 358/452 |
| 5,253,081 | * | 10/1993 | Shoji et al. | 358/450 |

FOREIGN PATENT DOCUMENTS

| 0435174 | 7/1991 | (EP) . |
| 0534320 | 3/1993 | (EP) . |
| 2648657 | 12/1991 | (FR) . |
| 63-229969 | 9/1988 | (JP) . |
| 2-16864 | 1/1990 | (JP) . |

* cited by examiner

Primary Examiner—Anh-Vinh Nguyen
(74) Attorney, Agent, or Firm—Fitzpatrick, Cella, Harper & Scinto

(57) ABSTRACT

Image data received via a communication line is stored in a data memory. The image data that has been stored in the image memory is not output intact but is subjected to a pixel reducing operation by a CPU. As a result, the image data is compressed in such a manner that an integral number of image pages will fit on one page on the receiving side. The resulting image is developed in a bit-map memory. Upon observing an output of an compressed image, the operator selects the necessary data and designates the required image using a keyboard. The designated image is read out of the data memory, developed intact in the bit-map memory and printed out in the received size.

27 Claims, 12 Drawing Sheets

IMAGE COMMUNICATION METHOD AND APPARATUS THEREFOR

This application is a continuation of application Ser. No. 07/984,839 filed Dec. 3, 1992.

BACKGROUND OF THE INVENTION

1. Field of the Invention

This invention relates to an image communication method and apparatus in a facsimile machine or the like.

2. Prior Art

An image communication apparatus such as one for facsimile communication employs two methods for outputting received image data. In one method, data received by the image communication apparatus is output immediately upon being received, and all of the image data sent by the transmitting side is output on the receiving side. In the other method, the received image data is temporarily saved in a memory such as a hard disk by a microprocessor the like incorporated within the image communication apparatus on the receiving side. According to this method, the operator verifies the received data on a monitor and selects the desired page to be output.

In many cases, an image communication apparatus of this kind, particularly a facsimile machine, is used by a plurality of individuals (such as the individuals on one floor). In such case, the received image data is recorded on paper or the like and often is distributed to each addressee when reception is completed. With this method of use, the necessary data must be picked up by each individual operator. This is a very inefficient operation and therefore is undesirable, but the method is effective in terms of providing immediate print-out. With the conventional method of immediate print-out, however, a large quantity of recording paper is consumed when many pages are received and recorded on recording paper in a single receiving operation.

SUMMARY OF THE INVENTION

Accordingly, an object of the present invention is to provide an image communication apparatus in which it is possible to reduce the consumption of recording paper on which received image data is recorded.

According to the present invention, the foregoing object is attained by providing an image communication apparatus for receiving and outputting image data in which a page of a predetermined size serves as a unit, comprising compressing means for compressing the receiving image data, editing means for editing a predetermined number of pages of the compressed image data to data collected together in the predetermined size, and output means for outputting the edited data.

According to another aspect of the present invention, the foregoing object is attained by providing an image communication apparatus for transmitting image data in which a page of a predetermined size serves as a unit, comprising compressing means for compressing the image data, editing means for editing a predetermined number of pages of the compressed image data to data collected together in the predetermined size, and transmitting means for transmitting the edited data.

Further, the present invention provides an image communication method for receiving and outputting image data in which a page of a predetermined size serves as a unit, comprising a compression step of compressing the image data, an editing step of editing a predetermined number of pages of the compressed image data to data collected together in the predetermined size, and an output step of outputting the edited data.

In accordance with the arrangement described above, each page of received image data is compressed to a size that will allow a predetermined number of pages to fit on a single page, the predetermined number of pages are gathered together and edited to a single page, and the resulting data is then output.

Further, each page of image data to be transmitted is edited to a size that will allow a predetermined number of pages to fit on a single page, and the resulting data is then transmitted.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

<First Embodiment>

A facsimile apparatus having a memory in which image data is stored temporarily will be described as a first embodiment of the present invention.

Figure 1:
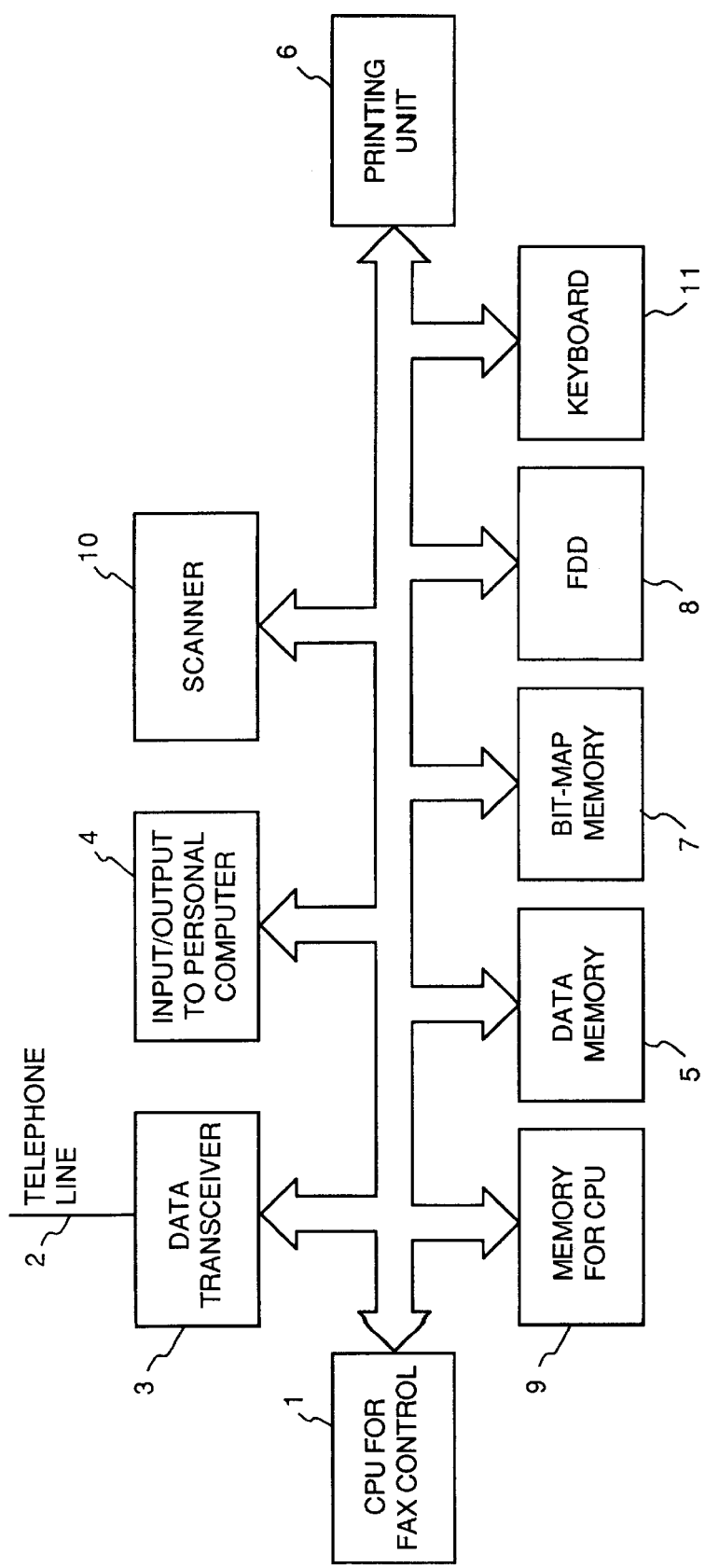
FIG. 1 is a block diagram illustrating a facsimile apparatus in a first embodiment embodiment of the present invention.

FIG. 1 is a block diagram showing a facsimile apparatus embodying the present invention. As shown in FIG. 1, the apparatus includes a central processing unit (CPU) 1 which controls the operation of the overall apparatus. A telephone line 2 is employed for sending and receiving data when the facsimile apparatus is used. A data transceiver 3 performs an exchange of data between the interior of the facsimile apparatus and the telephone line. An input/output unit 4 for a personal computer performs an exchange of data with an external personal computer. A data memory 5 stores data received by the data transceiver. A printing unit 6 outputs the received data on paper. Information that is to be printed out is stored in a bit-map memory 7 as a print image. A floppy-disk drive (FDD) 8 stores a duplicate of the information stored in the data memory 5. A memory 9 stores program instructions which are used by the central processing unit 1 when it executes a program. A scanner 10 reads images, and a keyboard 11 is used by an operator to input data for operating the facsimile apparatus.

An operation for receiving data performed by the facsimile apparatus constructed as set forth above will now be described.

Figure 2:
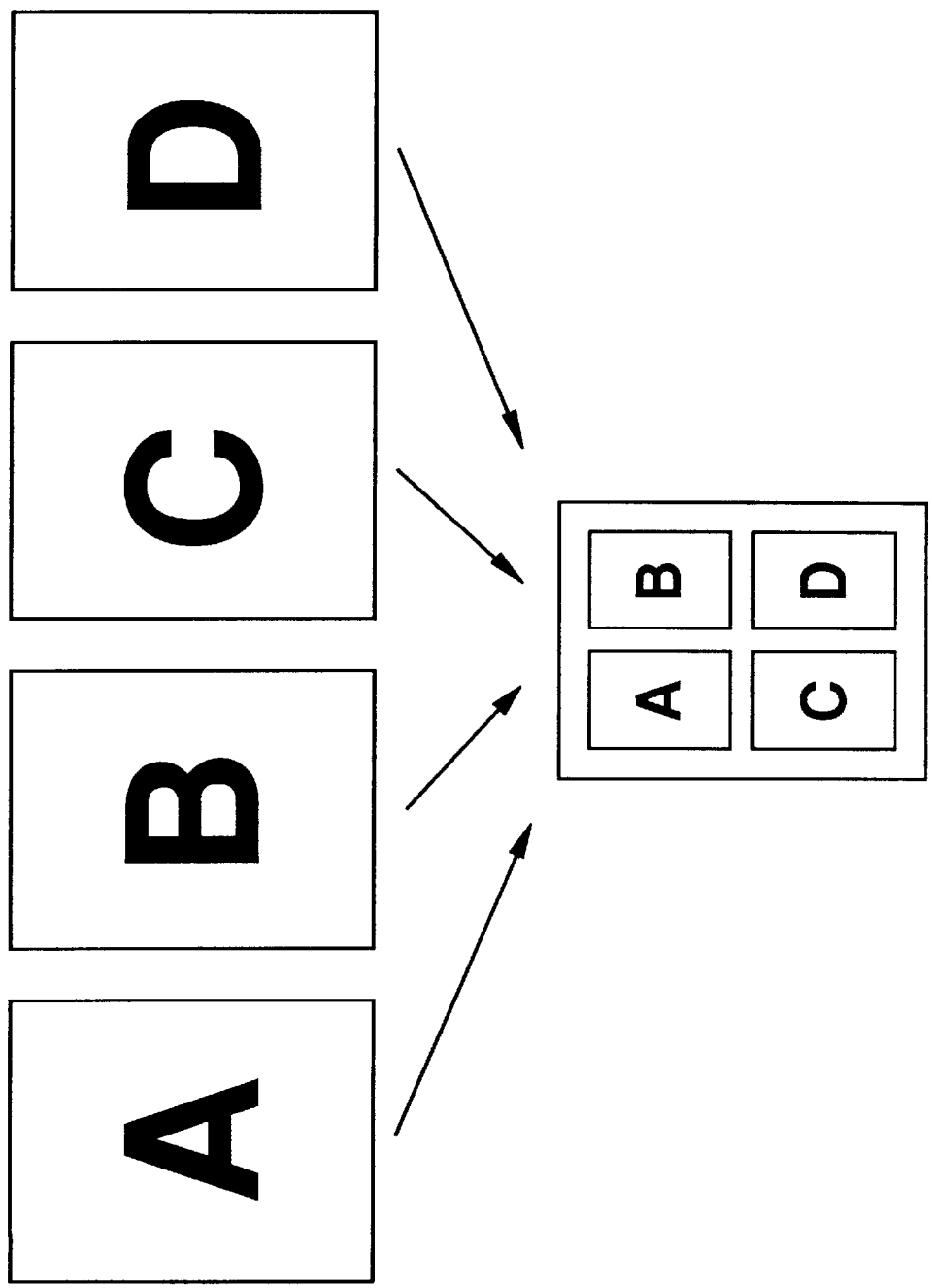
FIG. 2 is a diagram showing an example in which images are compressed in the facsimile apparatus of the first embodiment.

Data sent via the telephone line 2 is accepted within the facsimile apparatus by the data transceiver 3 and is stored in the data memory 5. This operation continues until the processing for receiving one mass of image data is completed. By way of example, when data of a plurality of pages is transferred on the sending side, the data composed of this number of pages is stored in the data memory 5. Next, the received data is compressed and is output from the printing unit 6 to one sheet of paper in a form in which the plurality of pages are grouped together. At this time, the number of pages of received data collected together on one sheet of paper is capable of being designated by the user. For example, as illustrated in FIG. 2, it is assumed that the user makes a designation to the effect that four pages of received data of size A4 is to be output upon being collected together on a single page of size A4. If the output size is A4 in this case, then the received image data is compressed to ¼ of the input size so that the four pages of data will fit on one page. If, when printing is performed in this format, the total number of received pages is not a whole-number multiple of the number of pages to be collected on one sheet of paper, the number of pages fit on the final page will be a fractional number. In such case, the user selects to output the final page as is, i.e., with a fractional number of the received pages printed thereon, or to receive ensuing image data and then output the final page as a portion equivalent to one page.

Upon observing an output of a designated number of pages that have been compressed and collected together, the user of the facsimile apparatus selects the necessary pages (the pages which the user desires to be printed in the standard size), designates the necessary pages and outputs them. There are two methods through which this can be accomplished. One is to operate the facsimile apparatus itself by using the keyboard 11 so as to output the data in the data memory 5 by means of the printing unit 6. The other method is to transfer the data to the external personal computer and print out the data by means of the computer. There are two methods of transferring the data to the external personal computer. One method relies upon a communication cable employing the microprocessor input/output unit 4, and the other method is through the intermediary of a floppy disk utilizing the FDD 8. Furthermore, since it is conceivable that a plurality of documents may be stored in the memory, each document is assigned an identification number. The operator specifies a desired document by designating its identification number.

Figure 3:
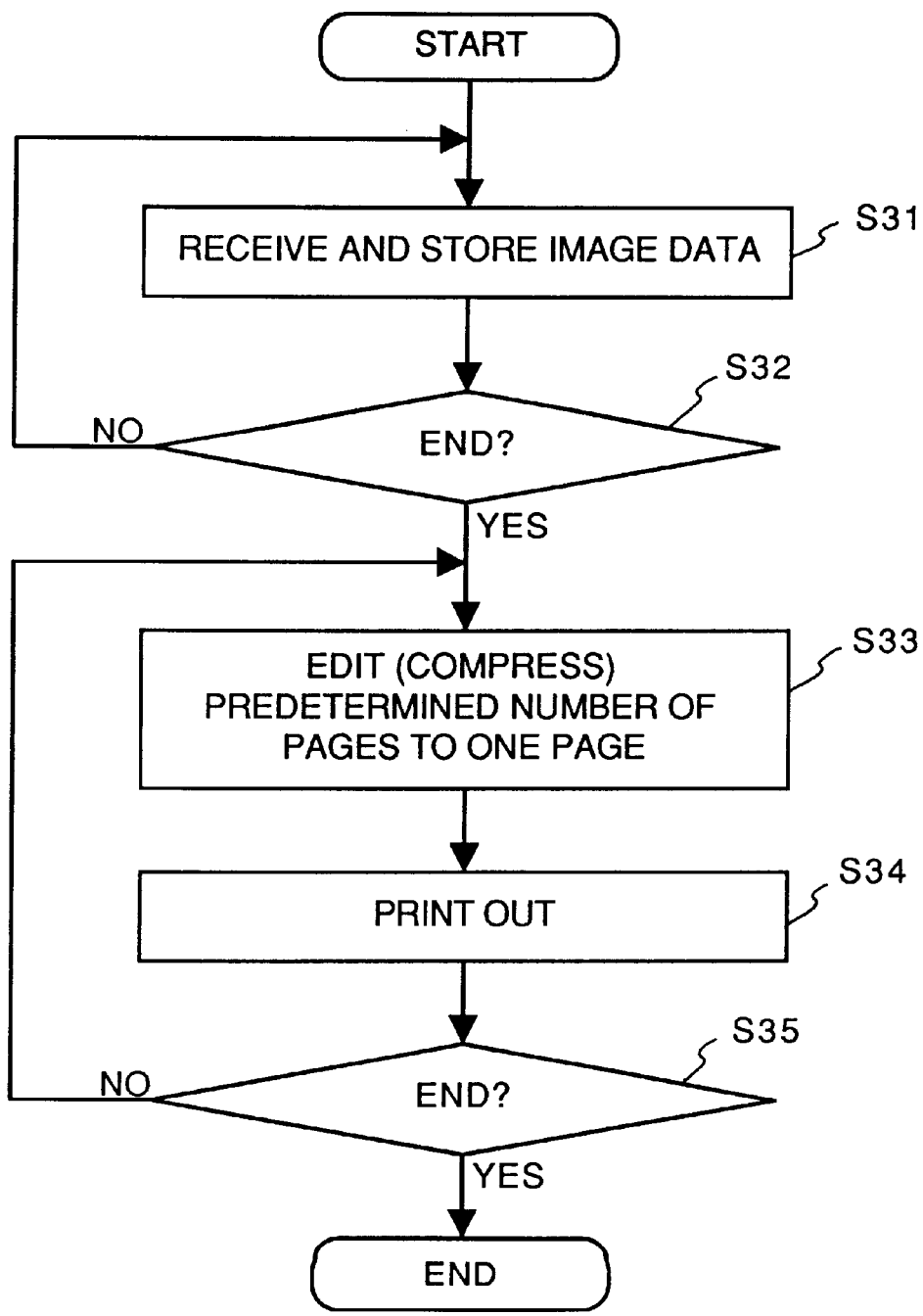
FIG. 3 is a flowchart of image reception performed by the facsimile apparatus of the first embodiment.

FIG. 3 illustrates the procedure of processing executed by the CPU 1 from reception of the image data to printout thereof by the method described above.

First, at step S31, image data is stored successively in the data memory 5 as it is received. This operation is repeated until reception of a mass of image data ends. When reception of the image data ends, the program proceeds to step S33. Here the received image data is edited in such a manner that a predetermined number of pages thereof will fit on one page, and the edited image data is developed in the bitmap memory 7. The developed image data is printed out at step S34. An arrangement can be adopted in which the number of pages collected on one page is designated by the user. In such case, a procedure will be necessary for storing the value designated by the user in the memory 9 from the keyboard 11. Printout is repeated until all of the received pages have been printed. In a case where output waits until the final page becomes full, as mentioned above, the system waits for transmission of image data and then prints out the final page when the data to be fit on one page has been gathered.

Figure 4:
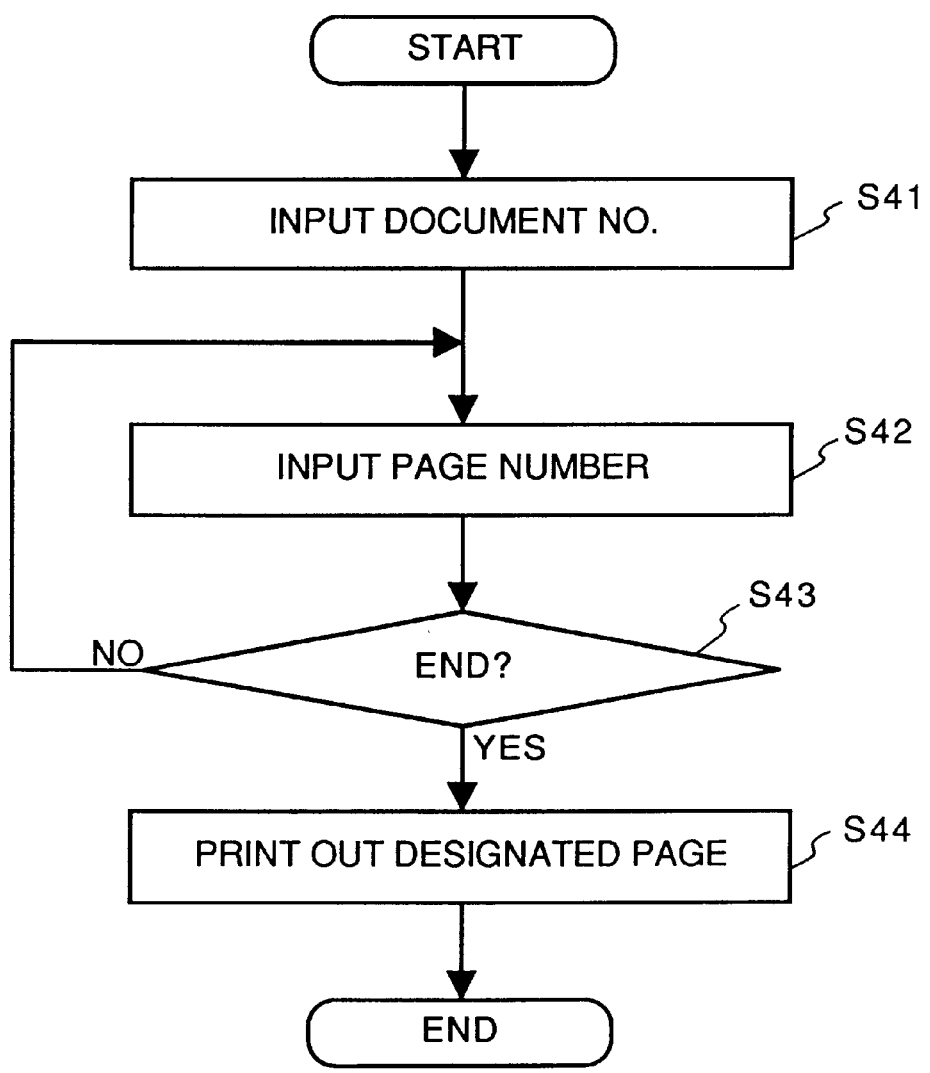
FIG. 4 is a flowchart of image output performed by the facsimile apparatus of the first embodiment.

FIG. 4 is a flowchart illustrating the processing performed by the CPU 1 from operator selection of the pages to be output in the size sent from the sending side to output of these pages.

First, at step S41, the operator enters the document number and stores this number in the memory 9. Next, at step S42, a page number desired to be output is designated and this also is stored in the memory 9. Though it is permissible to output pages while designating the page numbers, here the required number of pages is designated collectively. When page designation ends, the stored pages of the document whose document number has been stored in the memory 9 along with the pages are printed out intact in the form of the received image.

By printing out received image data using the facsimile apparatus having the foregoing construction and using the foregoing procedure, it is possible for the operator to pick out and print in the original size only those pages which would be inadvisable to print out in compressed form. This makes it possible to avoid wasteful use of recording paper.

<Second Embodiment>

A case that is the opposite of the foregoing will be considered, namely a case in which data is transferred from the facsimile apparatus on the sending side. In the conventional facsimile apparatus, data transfer is performed in such a manner that one page of input paper also becomes one page on the receiving side. In the facsimile apparatus of this embodiment, on the other hand, data is transmitted through the method set forth below to conserve recording paper.

First, a mass of image data desired to be transferred is read in by the scanner 10 of FIG. 1 in its entirety (a plurality of pages) and the image data is stored in the data memory 5. Next, the data desired to be transferred is compressed to a group of a plurality of pages and is edited as one page of image data, after which the image data is transferred from the data transceiver 3 to the apparatus on the receiving side through the telephone line 2. An arrangement is adopted in which the number of pages of the original data grouped together as one page of data can be designated by the user.

Figure 5:
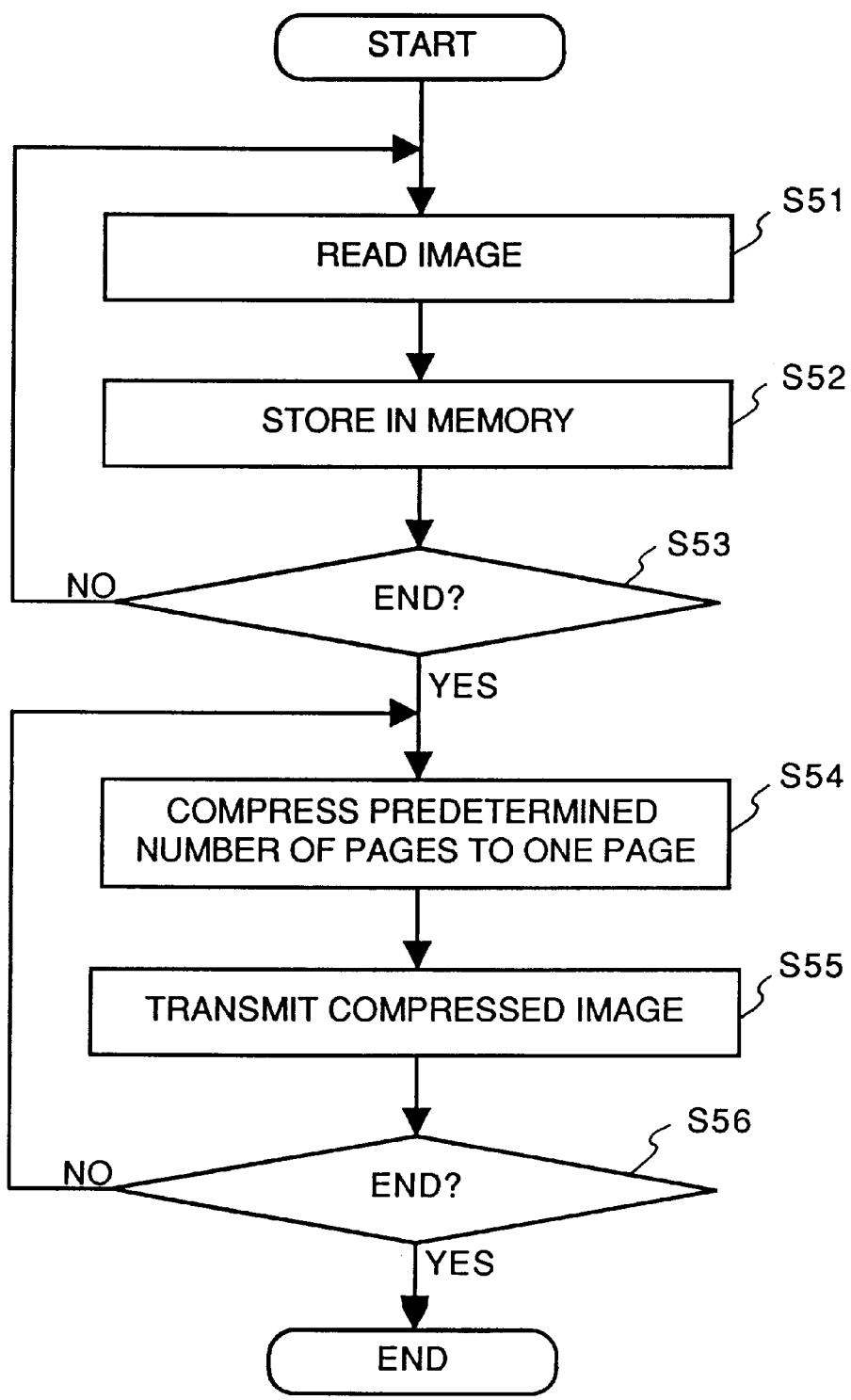
FIG. 5 is a flowchart of image transmission performed by the facsimile apparatus according to a second embodiment of the present invention.

FIG. 5 illustrates the processing procedure executed by the CPU 1 for the purpose of performing the foregoing processing.

First, the image of the original is read at step S51 and is stored in the data memory 5 at step S52. This processing is repeated until the foregoing operations ends with regard to a series of originals. When reading in of the image ends, the image data that has been stored is compressed at step S54 in order to fit the predetermined number of pages of the originals on one page. The image data is edited to one page and then transmitted at step S55. With regard to the predetermined number of pages, the operator enters a desired value from the keyboard 11 and this value is stored in the memory 9 and used at the time of data transmission.

The image data that has thus been transmitted to the apparatus on the receiving side will have a lower resolution in comparison with the original image. However, since the amount of data is reduced, the cost for transfer can be reduced and so can the amount of recording paper used for printout on the receiving side.

It should be noted that the present invention is not limited to a single apparatus but may be applied to a system composed of a plurality of apparatus so long as the functions of the present invention are implemented. It goes without saying that the present invention can be applied also to a system in which the processing is carried out by supplying a program to the apparatus or system.

<Third Embodiment>

In this embodiment, a facsimile apparatus is connected to a host computer, and information received from the host computer and data received by the facsimile apparatus are printed together on a single sheet of recording paper, in accordance with the following procedure.

The facsimile apparatus has a printing function. A description will be given as to how the data flows when the facsimile apparatus functions as a printer. Referring to FIG. 1, data is taken into the facsimile apparatus via an the input/output unit 4 connected to a hostcomputer, and the data thus taken is developed as an output image in the bit-map memory 7. The developed output image is then output from the printing unit 6. Meanwhile, data received by the facsimile apparatus through a telephone line is stored in the data memory 5 and is then developed in the bit-map memory 7 and finally printed by the printing unit 6 as in the printer mode operation of the facsimile apparatus.

Figure 6:
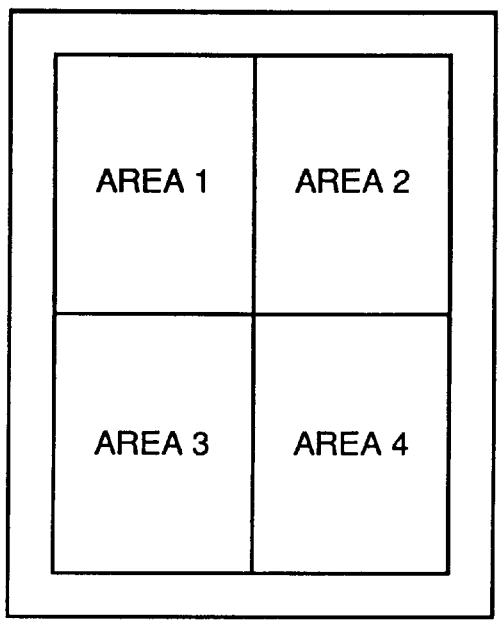
FIG. 6 and 7 are diagrams showing examples in which images are compressed in the facsimile apparatus of a third and fourth embodiment of the present invention.

When information corresponding to four pages is compressed and recorded in a single sheet of recording paper as shown in FIG. 6, image data from the host computer is printed in, for example, areas 1 and 2, and facsimile communication output is printed in areas 3 and 4. By using this technique, it is possible to obtain a single page of recording paper carrying both the print information acquired from the host computer and the data received by the facsimile. The number of areas contained in the single page of recording paper, as well as arrangement of such areas, can be changed and determined by the user from the host computer or from the facsimile apparatus.

Figure 8:
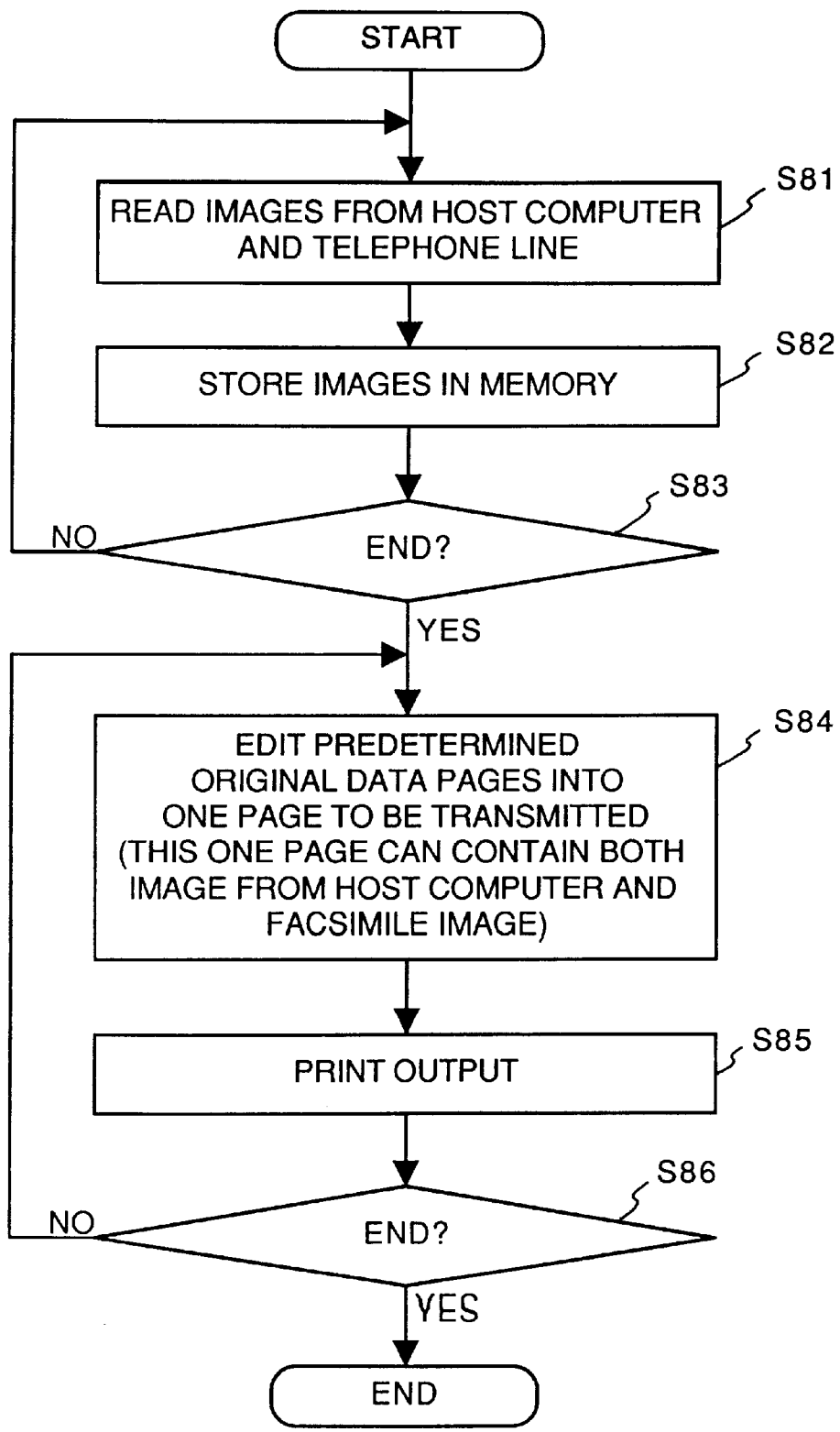
FIG. 8 is a flowchart of image edition performed by the facsimile apparatus of the fourth embodiment.

This series of operation is performed by the CPU 1. The flow of the process conducted by the CPU 1 will be described with reference to FIG. 8 which is a flow chart showing the steps employed in the process.

Image data from the host computer and the image data from the telephone circuit are read in Step S81 and are then stored in the data memory 5 in Step S82. When receipt of the series of image data is finished, an answer YES is given to the question posed in Step S83, and the received data is developed in the bit-map memory 7 in Step S84 so that data on a predetermined number of pages are arranged on a single page to be output. The data thus arranged is then output for printing in Step S85. The printout operation is continued until the data on all the received data pages are printed. When the data of the final page has been printed, an answer YES is given in Step S86, thus completing the printing process.

<Fourth Embodiment>

Figure 7:
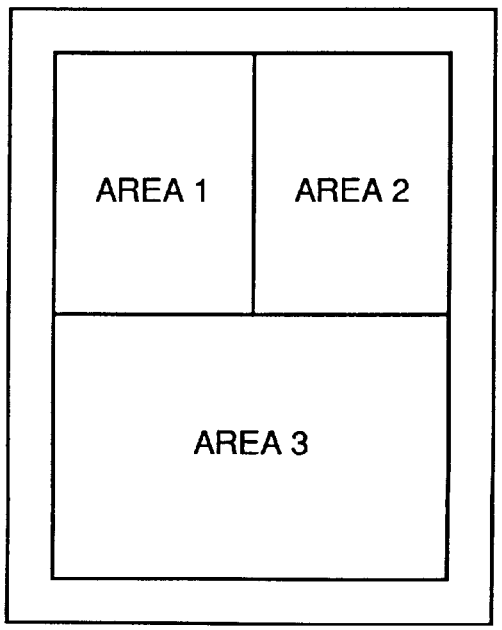

According to the invention, when data of a plurality of received data pages are compressed and output on a single sheet of recording paper, it is possible to change the size of the respective pages data output on the single sheet of recording paper in a manner shown in FIG. 7 by way of example. Such an embodiment will be described as a fourth embodiment.

When it is required to determine the arrangement of received data pages on the single sheet of recording paper such that different data pages have different sizes, the user can determine the size and arrangement of the received data pages while monitoring an image displayed on a display which is provided on the facsimile apparatus and which has a display area large enough to show such an image. If such display function is not available on the facsimile apparatus, the received data are transferred to the host computer to enable the user to designate the size of the received data pages through the host computer.

When a plurality of original data pages are compressed at the transmitting side into one page which is to be transmitted as in the second embodiment, the sizes of the original data pages are designated through the transmitting facsimile apparatus when these original data pages are read or designated after completion of the reading prior to the transmission. Layout of these data pages, as well as the pattern of division of the single page to be transmitted, can be freely determined by the user.

Figure 9:
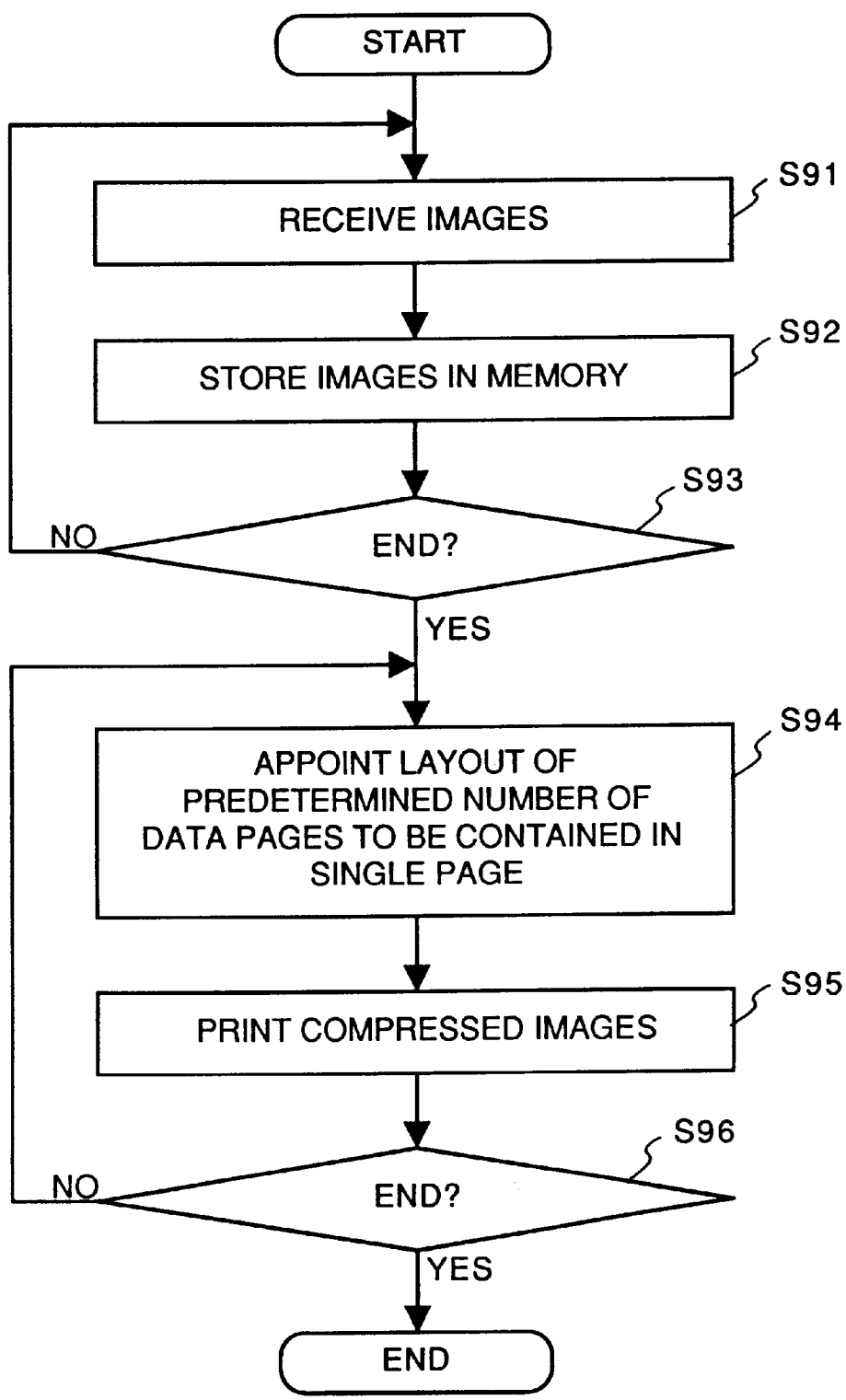
FIG. 9 is a flowchart of image reception performed by the facsimile apparatus of the fourth embodiment.

The described process is performed under the control of the CPU 1 in accordance with flow diagrams which will be described hereinunder with reference to FIGS. 9 and 10. FIG. 9 shows the flow of the process executed when the compression and layout are conducted at the transmitting side, while FIG. 10 shows the flow which is followed when the compression and layout are conducted at the receiving side.

Referring first to FIG. 9, image data is received through a telephone line 2 in Step S91 and the received data is stored in a memory in Step S92. A series of data is thus read and stored. In Step S93, if storage of the series of data is complete, the process proceeds to Step S94 in which, as shown in FIG. 7, plurality of received images are compressed and laid out in the area of the bitmap memory 7 which corresponds to a single sheet of recording paper on which such images are to appear. The thus edited composite image composed of the plurality of compressed images is then printed in Step S95. Then, in Step S96, if the output printing of all the images is complete, the series of operation is terminated.

Figure 10:
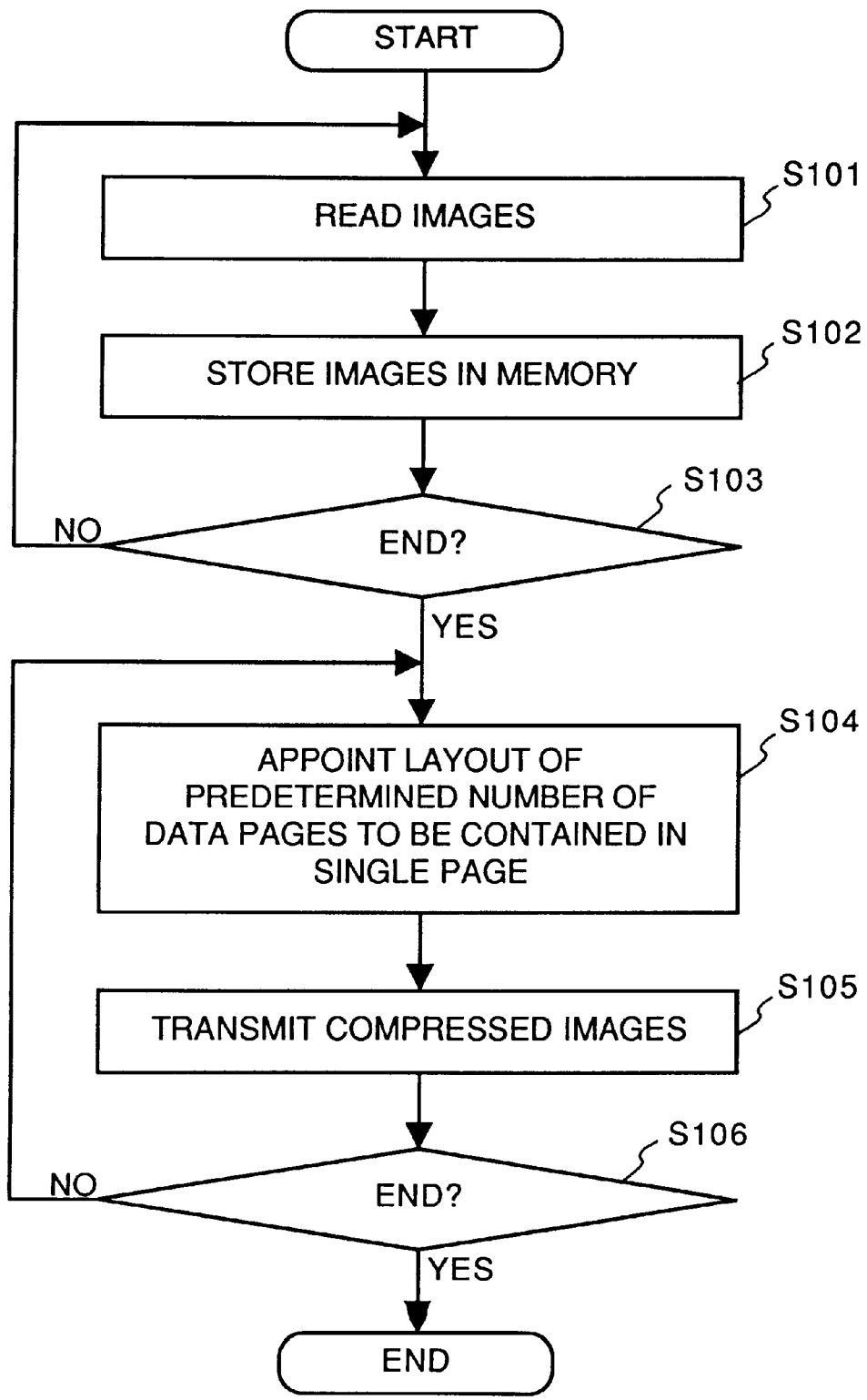
FIG. 10 is a flowchart of image transmission performed by the facsimile apparatus according to the second embodiment of the present invention.

Referring now to FIG. 10, image data is read by the scanner 10 in Step S101 and stored in the memory 5 in Step S102. After a batch of the image data has been read in Step S103, the process proceeds to Step S104 in which the images read by the scanner 10 and now stored are laid out on an area corresponding to a single page of transmission, as shown in FIG. 7. This single page containing plural read images is then transmitted in Step S105. The layout of the images on the single sheet of transmission can be freely changed by the operator. The process is completed when all the sheet images have been transmitted in Step S106.

It is thus possible to output the data with layout freely determined by the operator.

In the third and fourth embodiments as described, the printing unit 6 may be of any suitable printing type. An electrophotographic printing system and an ink jet printing system will be described as typical examples of the printing unit 6, with specific reference to FIGS. 11 and 12. In these Figures, components which are not directly related to printing, such as a scanner, FDD and so forth, are omitted.

Figure 11:
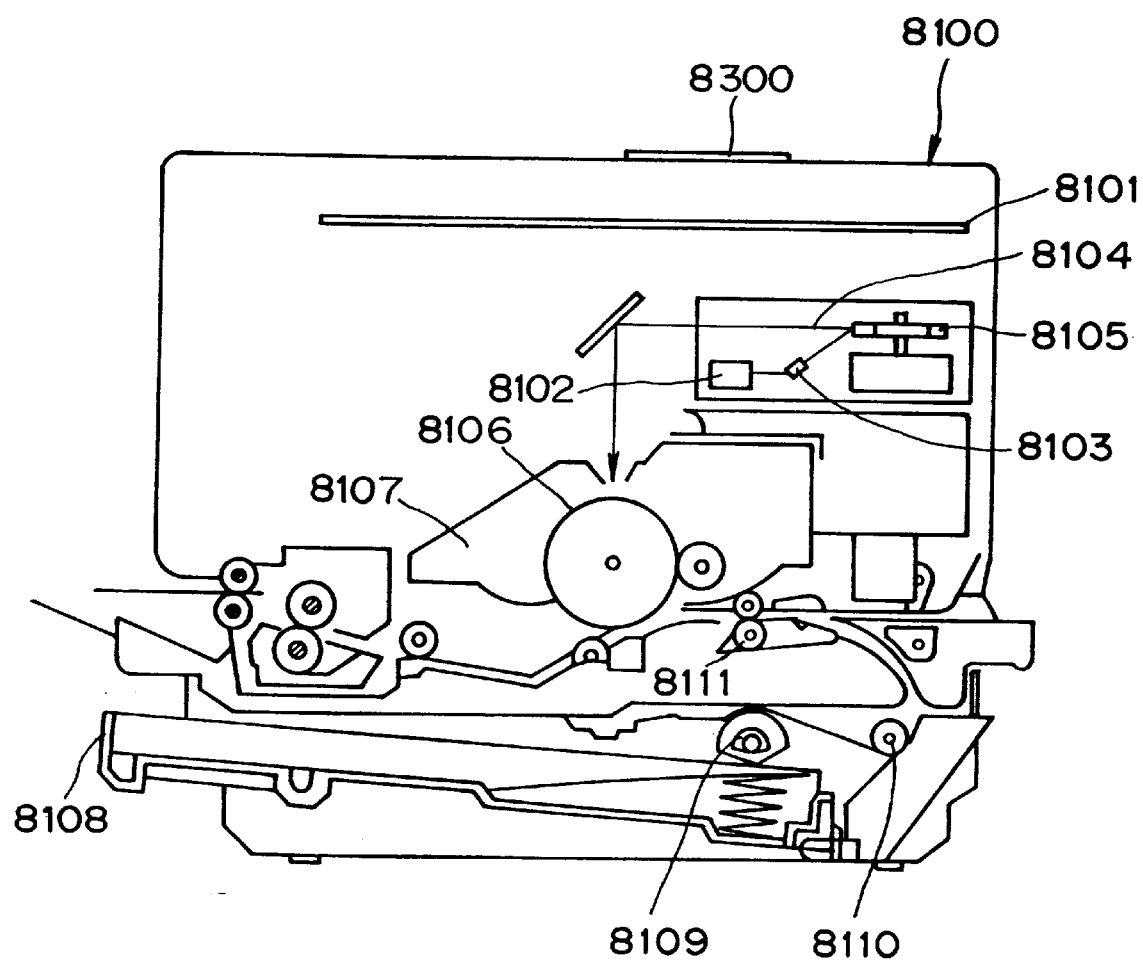
FIG. 11 is a sectional view showing a laser-beam printer.

FIG. 11 is a sectional view of a laser beam type electrophotographic printing system which is referred to as an LBP unit. This printing system has a main part 8100 which forms an image of an image data on a recording medium, under the control of a control section 8101. The printing unit may be equipped with a function for forming a pattern in accordance with the input code data so as to print data acquired from the host computer, as in the third embodiment. Various operation switches and display device such as of LED type are arranged on an operation panel 8300, and the keyboard 11 shown in FIG. 1 also is mounted in the operation panel 8300. The control unit 8101 includes the components of the facsimile apparatus shown in FIG. 1, such as the CPU 1, data transmission/receiving section 3, the I/O unit 4 for connection to a microcomputer, data memory 5 and the bit-map memory 7. The control unit 8101 controls the whole LBP 8100 by executing, for example, the flow diagram of any one of the described embodiments.

The laser driver 8102 is a circuit for driving a semiconductor laser unit 8103. The laser driver 8102 generates a laser beam 8104 by driving the semiconductor laser unit 8103. A polygon mirror 8105 rotating at a constant speed reflects the laser beam 8104 with one of the side faces so that the laser beam 8104 scans and exposes on an electrostatic drum 8106 by being swept back and forth in a direction perpendicular to a conveying direction of a recording sheet. An electrostatic latent image such as a character pattern is formed on the electrostatic drum 8106. A developing unit 8107 arranged around the electrostatic drum 8106 develops the latent image and transfer the image onto a recording sheet. The recording sheet is a cut-sheet type recording sheet set in a cassette 8108 attached to the LBP 8100. A paper feeding roller 8109, document feeding rollers 8110 and 8111 convey the sheet into the LBP 8100 and supply the sheet to the electrostatic drum 8106.

Figure 12:
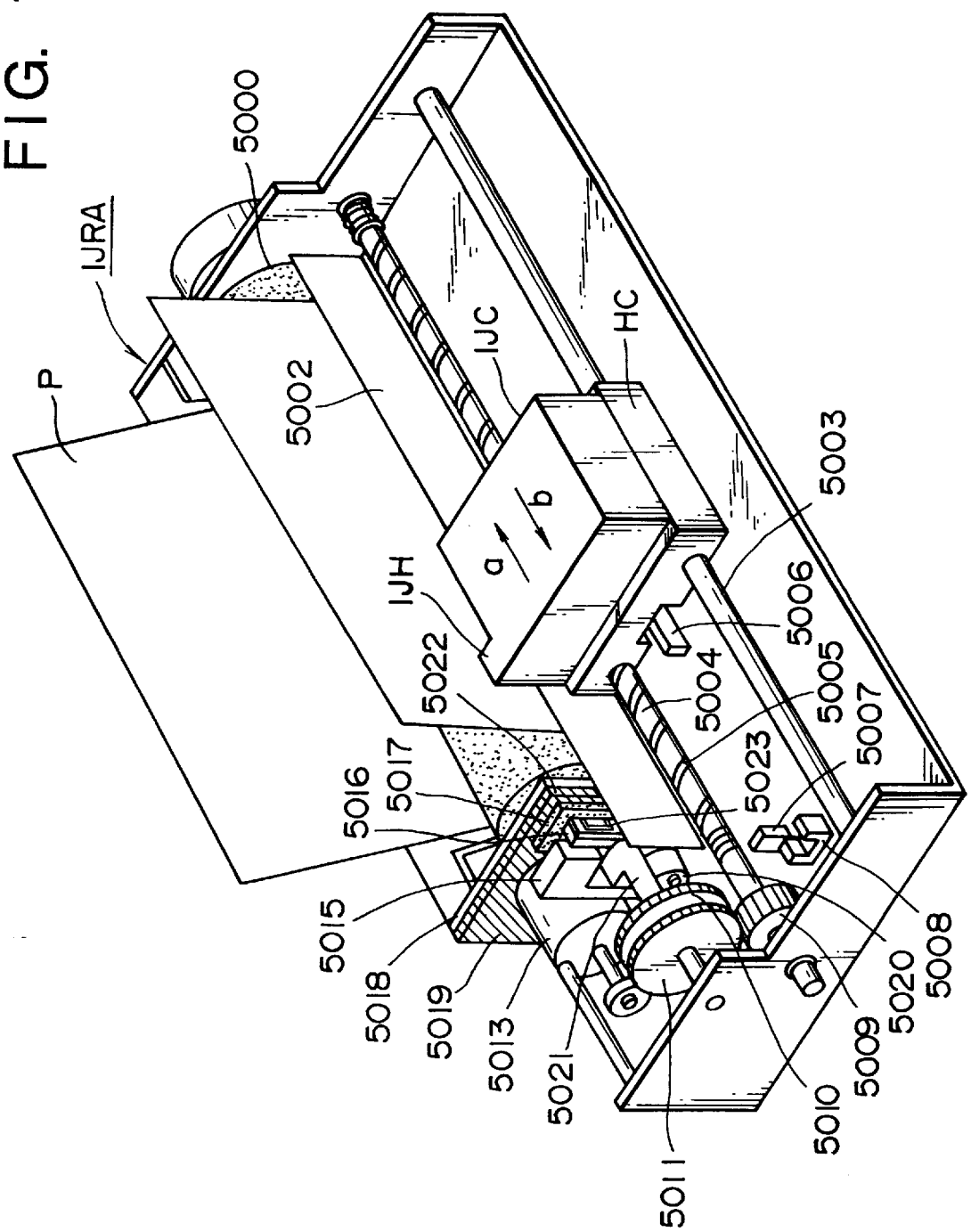
FIG. 12 is a diagram showing the structure of an ink-jet printer.

FIG. 12 is a schematic illustration of an ink jet recording system IJRA.

In FIG. 12, numeral 5013 denotes a driving motor. Numeral 5004 is a lead screw which rotates interlocking with the forward/reverse rotation of the driving motor 5013 via driving force transmission gears 5011 and 5009. A carriage HC having a pin (not shown) which engages with a spiral groove 5005 of the lead screw 5004 is reciprocally moved in the direction of arrows a and b. An ink-jet cartridge IJC is mounted on the carriage HC. Numeral 5002 denotes a paper holder to press a recording sheet against a platen 5000 along a moving direction of the carriage HC. Numeral 5003 denotes a carriage guide. Photocouplers 5007 and 5008 are home-position detectors for recognizing a lever 5006 of the carriage HC and switching over the rotational direction of the motor 5013. A support member 5016 supports a cap member 5022 to cap the front face of an ink-jet head IJH. A suction member 5015 sucks the recording head IJH in contact with an opening 5023 in the cap member 5022 for preventing choking of the recording head with ink. A cleaning blade driving member 5019 drives a cleaning blade 5017. A main body support plate 5018 supports the cleaning blade 5017 and the cleaning blade driving member 5018. Note that a general cleaning blade can also be applied to this ink-jet printer. Numeral 5021 denotes a lever for starting the suction by the suction member 5015. The lever 5021 moves with the motion of a cam 5020 which engages with the carriage HC. The cam 5020 is driven by a driving force from the driving motor 5013 transmitted by well-known transmission means such as a switching over of a clutch.

When the carriage HC comes to the home position side area, the recording head receives desired processing of the above capping, cleaning and sucking at corresponding positions, led by the lead screw 5005.

Next, the structure of a control circuit for performing recording control of the above-described ink-jet printer will be described with reference to a block diagram of FIG. 13.

Figure 13:
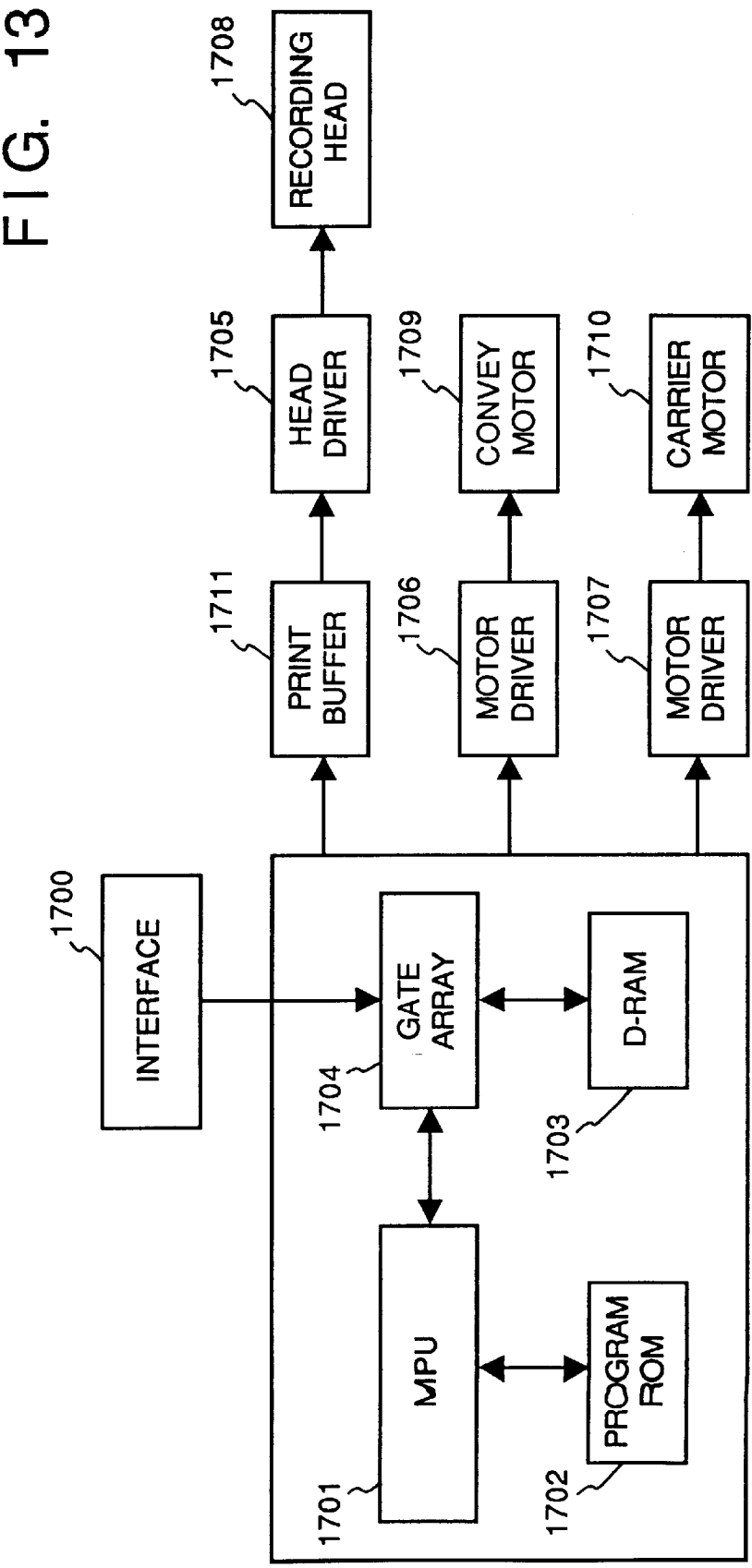
FIG. 13 is a block diagram showing the printer of FIG. 12.

In FIG. 13, numeral 1700 denotes an interface to which recording signals are input. A MPU 1701 controls the overall printer. A ROM 1702 stores control program(s) which are executed by the MPU 1701. A D-RAM 1703 is used as a work area of the MPU 1701 and is also used for storing bit map data. A gate array 1704 controls the supply of recording data to a recording head 1708, and controls data transfer between the interface 1700, the MPU 1701 and the RAM 1703. A carrier motor 1710 carries the recording head (IJH) 1708, and a convey motor 1709 conveys a recording sheet. Motor drivers 1706 and 1707 drive the carrier motor 1710 and the convey motor 1709 respectively. A print buffer 1711 stores image data to be recorded by one printing motion of the recording head 1708. A head driver 1705 drives the recording head 1708 in a predetermined timing in accordance with image data in the print buffer 1711.

A recording signal entered from the interface 1700 is converted into recording data for printing between the gate array 1704 and the MPU 1701, and is stored in the D-RAM 1703. The image data stored in the D-RAM 1703 are transferred at one printing motion of the recording head 1708.

In the described arrangement, the MPU 1701 may be the CPU 1 shown in FIG. 1, or may be a processor which is used exclusively for the purpose of controlling the printing unit 6.

It is possible to output and print the data received from a host computer, by using the arrangements described hereinbefore. Obviously, various other printing systems other then those described above can be used equally well.

As many apparently widely different embodiments of the present invention can be made without departing from the spirit and scope thereof, it is to be understood that the invention is not limited to the specific embodiments thereof except as defined in the appended claims.

What is claimed is:

1. A print control apparatus comprising:
   a receiver adapted to receive and store a plurality of pages of image data, each stored page having a predetermined size;
   a first designation unit adapted to designate a number of pages to be combined on a sheet of paper;
   an editor adapted to reduce the size of the stored pages to provide respective reduced pages each having a reduced size, said editor combining each of the designated number of the reduced pages to form a combined image for printing on one sheet of paper;
   a first print controller adapted to control a printer to print the combined image on the one sheet of paper;
   a second designation unit adapted to designate a desired one of the stored pages, the designation being made after the combined image has been printed on the one sheet of paper;
   a second print controller adapted to control the printer to print the designated page on another sheet of paper without receiving the designated page again; and
   a selector adapted to select data to be printed,
   wherein the designated number is represented as an integer $n_g$, a total number of stored pages is represented as an integer $n_t$, and a remainder number of final pages at an end of the plurality of received sages is represented as $n_r$, where $n_r$ equals $n_t$-modulo-$n_g$, and wherein, when $n_r$ does not equal zero, said selector selects whether or not a combined image of the $n_r$ reduced pages are to be printed on a first portion of a sheet of paper, with ensuing image data to be printed on a remainder portion of the sheet of paper.

2. A print control apparatus according to claim 1, wherein said print control apparatus is included in a facsimile apparatus.

3. A print control apparatus according to claim 1, further comprising a setting circuit adapted to independently set the reduced size for each of the reduced pages, such that the reduced pages need not all have a same reduced size.

4. An apparatus according to claim 1, further comprising the printer, which is adapted to print an image based upon the received image data.

5. A print control method comprising:

a receiving step of receiving and storing a plurality of pages of image data, each stored page having a predetermined size;

a first designation step of designating a number of pages to be combined on a sheet of paper;

an edit step of reducing the size of the stored pages to provide respective reduced pages each having a reduced size, said edit step combining each of the designated number of reduced pages to form a combined image for printing on one sheet of paper;

a first print control step of controlling a printer to print the combined image on the one sheet of paper;

a second designation step of designating a desired one of the stored pages having a predetermined size, the designation being made after the combined image is printed on the one sheet of paper;

a second print control step of controlling the printer to print the designated page on another sheet of paper without receiving the designated page again; and a selection step of selecting data to be printed, wherein the designated number is represented as an integer $n_g$, a total number of stored pages is represented as an integer $n_t$, and a remainder number of final pages at an end of the plurality of received pages is represented as $n_r$, where $n_r$ equals $n_t$-modulo-$n_g$, and wherein, when $n_r$ does not equal zero, said selection step selects whether or not a combined image of the $n_r$ reduced pages are to be printed on a first portion of a sheet of paper, with ensuing image data to be printed on a remainder portion of the sheet of paper.

6. A print control method according to claim 5, wherein said print control method is carried out in a facsimile apparatus.

7. A print control method according to claim 5, further comprising a size setting step of independently setting the reduced size for each of the reduced pages, such that the reduced pages need not all have a same reduced size.

8. A computer-readable storage medium storing a print control program executable by a computer, the program comprising:

program code for a receiving step of receiving and storing a plurality of pages of image data, each stored page having a predetermined size;

program code for a first designation step of designating a number of pages to be combined on a sheet of paper;

program code for an edit step of reducing the size of the stored pages to provide respective reduced pages each having a reduced size, the edit step combining each of the designated number of reduced pages to form a combined image for printing on one sheet of paper;

program code for a first print control step of controlling a printer to print the combined image on the one sheet of paper;

program code for a second designation step of designating a desired one of the stored pages, the designation being made after the combined image has been printed on the one sheet of paper;

program code for a second print control step of controlling the printer to print the designated page on another sheet of paper without receiving the designated page again; and program code for a selection step of selecting data to be printed, wherein the designated number is represented as an integer $n_g$, a total number of stored pages is represented as an integer $n_t$, and a remainder number of final pages at an end of the plurality of received pages is represented as $n_r$, where $n_r$ equals $n_t$-modulo-$n_g$, and wherein, when $n_r$ does not equal zero, the selection step selects whether or not a combined image of the $n_r$ reduced pages are to be printed on a first portion of a sheet of paper, with ensuing image data to be printed on a remainder portion of the sheet of paper.

9. A computer-readable storage medium according to claim 8, wherein the program is carried out to realize a facsimile function.

10. A computer-readable storage medium according to claim 8, wherein the program further comprises program code for a size setting step of independently setting the reduced size for each of the reduced pages, such that the reduced pages need not all have a same reduced size.

11. A print control apparatus comprising:

an input unit adapted to input a plurality of pages of image data;

a designation unit adapted to designate a number of pages to be combined on a sheet of paper;

an editor adapted to edit the plurality of pages of image data input using said input unit such that the designated number of pages are printed on one sheet of paper; and a selector adapted to select data to be printed, wherein the designated number is represented as an integer $n_g$, a total number of stored pages is represented as an integer $n_t$, and a remainder number of final pages at an end of the plurality of input pages is represented as $n_r$, where $n_r$ equals $n_t$-modulo-$n_g$, and wherein, when $n_r$ does not equal zero, said selector selects whether or not edited data of a remaining $n_r$ reduced pages is to be printed on a first portion of a sheet of paper, with ensuing data to be printed on a remaining portion of the sheet of paper.

12. An apparatus according to claim 11, further comprising:

a receiver adapted to receive data; and a printer adapted to print the data received by said receiver.

13. An apparatus according to claim 11, wherein said printing control apparatus is included in a facsimile apparatus.

14. An apparatus according to claim 11, wherein an image in each of the designated number of pages printed on the one sheet of paper is an image based upon image data obtained by reducing received image data.

15. An apparatus according to claim 11, further comprising:

a designation unit adapted to designate a page to be printed after printing the designated number of pages on the one sheet of paper; and a controller adapted to cause the printer to print the page designated by said designation unit.

16. A printing control method comprising:

an input step of inputting a plurality of pages of image data;

a designation step of designating a number of pages to be combined on a sheet of paper;

an edit step of editing the plurality of pages of image data input in said input step such that the designated number of pages are printed on one sheet of paper; and a selection step of selecting data to be printed, wherein the designated number is represented as an integer $n_g$, a total number of stored pages is represented as an integer $n_t$, and a remainder number of final pages at an end of the plurality of input pages is represented as $n_r$, where $n_r$ equals $n_t$-modulo-$n_g$, and wherein, when $n_r$ does not equal zero, said selection step selects whether or not edited data of a remaining $n_r$ reduced pages is to be printed on a first portion of a sheet of paper, with ensuing data to be printed on a remaining portion of the sheet of paper.

17. A method according to claim 16, further comprising:

a reception step of receiving data; and a printing step of printing the data received in said reception step.

18. A method according to claim 16, wherein said printing control method is performed by a facsimile apparatus.

19. A method according to claim 16, wherein an image in each of the designated number of pages printed on the one sheet of paper is an image based upon image data obtained by reducing received image data.

20. A method according to claim 16, further comprising:

a designation step of designating a page to be printed after printing the designated number of pages on the one sheet of paper; and a control step of causing the printer to print the page designated in said designation step.

21. A computer-readable storage medium storing a program for implementing a printing control method, the program comprising:

program code for an input step of inputting a plurality of pages of image data;

program code for a designation step of designating a number of pages to be combined on a sheet of paper;

program code for an edit step of editing the plurality of pages of image data input in the input step such that the designated number of pages are printed on one sheet of paper; and program code for a selection step of selecting data to be printed, wherein the designated number is represented as an integer $n_g$, a total number of stored pages is represented as an integer $n_t$, and a remainder number of final pages at an end of the plurality of input pages is represented as $n_r$, where $n_r$ equals $n_t$-modulo-$n_g$, and wherein, when $n_r$ does not equal zero, the selection step selects whether or not edited data of a remaining $n_r$ reduced pages is to be printed on a first portion of a sheet of paper, with ensuing data to be printed on a remaining portion of the sheet of paper.

22. A computer-readable storage medium according to claim 21, wherein the program further comprises:

program code for a reception step of receiving data; and program code for a printing step of printing the received data.

23. A computer-readable storage medium according to claim 21, wherein the program is executed by a facsimile apparatus.

24. A computer-readable storage medium according to claim 21, wherein an image in each of the designated number of pages printed on the one sheet of paper is an image based upon image data obtained by reducing received image data.

25. A computer-readable storage medium according to claim 21, wherein the program further comprises:

program code for a designation step of designating a page to be printed after printing the designated number of pages on the one sheet of paper; and program code for a control step of causing the printer to print the designated page.

26. A computer program product loadable into a memory of a computer, said program product comprising:

program code for an input step of inputting a plurality of pages of image data;

program code for a designation step of designating a number of pages to be combined on a sheet of paper;

program code for an edit step of editing the plurality of pages of image data input in the input step such that the designated number of pages are printed on one sheet of paper; and program code for a selection step of selecting data to be printed, wherein the designated number is represented as an integer $n_g$, a total number of stored pages is represented as an integer $n_t$, and a remainder number of final pages at an end of the plurality of input pages is represented as $n_r$, where $n_r$ equals $n_t$-modulo-$n_g$, and wherein, when nr does not equal zero, the selection step selects whether or not edited data of a remaining $n_r$ reduced pages is to be printed on a first portion of a sheet of paper, with ensuing data to be printed on a remaining portion of the sheet of paper.

27. A computer program product loadable into a memory of a computer, said program product comprising:

program code for a receiving step of receiving and storing a plurality of pages of image data, each stored page having a predetermined size;

program code for a first designation step of designating a number of pages to be combined on a sheet of paper;

program code for an edit step of reducing the size of the stored pages to provide respective reduced pages each having a reduced size, the edit step combining each of the designated number of reduced pages to form a combined image for printing on one sheet of paper;

program code for a first print control step of controlling a printer to print the combined image on the one sheet of paper;

program code for a second designation step of designating a desired one of the stored pages, the designation being made after the combined image has been printed on the one sheet of paper;

program code for a second print control step of controlling the printer to print the designated page on another sheet of paper without receiving the designated page again; and program code for a selection step of selecting data to be printed, wherein the designated number is represented as an integer $n_g$, a total number of stored pages is represented as an integer $n_t$, and a remainder number of final pages at an end of the plurality of received pages is represented as $n_r$, where $n_r$ equals $n_t$-modulo-$n_g$, and wherein, when $n_r$ does not equal zero, the selection step selects whether or not a combined image of the $n_r$ reduced pages are to be printed on a first portion of a sheet of paper, with ensuing image data to be printed on a remainder portion of the sheet of paper.

* * * * *

UNITED STATES PATENT AND TRADEMARK OFFICE
CERTIFICATE OF CORRECTION

PATENT NO. : 6,191,870 B1  
DATED : February 20, 2001  
INVENTOR(S) : Masahiro Takayanagi Page 1 of 1

It is certified that error appears in the above-identified patent and that said Letters Patent is hereby corrected as shown below:

Title page,
Item [57] ABSTRACT,
Line 8, "an" (second occurrence) should read -- the -- and "the" should read -- an --.

Column 4,
Line 61, "operations" should read -- operation --.

Column 5,
Line 26, "an" should be deleted;
Line 27, "hostcomputer" should read -- host computer --;
Line 47, "operation" should read -- operations --.

Column 6,
Line 2, "pages data" should read -- data pages --.

Column 7,
Line 29, "transfer" should read -- transfers --.

Column 8,
Line 66, "sages" should read -- pages --.

Signed and Sealed this

Twenty-sixth Day of February, 2002

*Attest:*

*Attesting Officer*

JAMES E. ROGAN
*Director of the United States Patent and Trademark Office*